United States Patent [19]

Beausoleil et al.

[11] Patent Number: 4,597,051
[45] Date of Patent: Jun. 24, 1986

[54] ALL POINTS ADDRESSABLE PRINTER/STORAGE TUBE IMAGE COPIER SYSTEM

[75] Inventors: William F. Beausoleil, Hopewell Junction; David M. Pangerc, Saugerties; Vaughn D. Winkler, New Paltz, all of N.Y.

[73] Assignee: International Business Machines Corporation, Armonk, N.Y.

[21] Appl. No.: 550,664

[22] Filed: Nov. 10, 1983

[51] Int. Cl.⁴ .............................................. G06F 15/26
[52] U.S. Cl. .................................... 364/523; 364/200; 346/35; 358/297; 358/296
[58] Field of Search .................. 364/518, 523, 200; 358/294, 296, 297; 346/35

[56] References Cited

U.S. PATENT DOCUMENTS

| | | | |
|---|---|---|---|
| 3,936,664 | 2/1976 | Sato | 364/523 |
| 4,000,486 | 12/1976 | Schomburg | 364/200 |
| 4,287,521 | 9/1981 | Hakoyama | 346/35 |
| 4,345,276 | 8/1982 | Colomb | 364/523 |
| 4,386,359 | 5/1983 | Regehr et al. | 346/35 |
| 4,394,685 | 7/1983 | Yeomans et al. | 346/296 |
| 4,415,912 | 11/1983 | Kudelski et al. | 358/297 |

FOREIGN PATENT DOCUMENTS 0123152  7/1983  Japan .................................. 364/523

OTHER PUBLICATIONS

"Scan-Converting Computer Output Printing Tube", by M. D. Harsh, RCA Technical Notes, No. 335, Nov. 1959.
"Character Generator", by W. D. Torrey, I.B.M. Technical Disclosure Bulletin, p. 1382, Sep. 1979.

Primary Examiner—Parshotam S. Lall
Attorney, Agent, or Firm—Curtis G. Rose; J. Jancin, Jr.; R. W. Berray

[57] ABSTRACT

A digital All-Points Addressable (APA) Printer/Image Copier system is disclosed and claimed which provides both the image manipulation capability of an APA and the direct copying capability of an analog image copier in one device. The preferred embodiment of the present invention employs a dot-matrix electro-erosion printing apparatus.

12 Claims, 6 Drawing Figures

ALL POINTS ADDRESSABLE PRINTER/STORAGE TUBE IMAGE COPIER SYSTEM

DESCRIPTION

TECHNICAL FIELD

This invention relates to an All Points Addressable (APA) Printer/Storage Tube Image Copier.

BACKGROUND ART

APAs are currently available for use with a variety of display systems. Several of these APA printers are capable of printing both character and graphic images. A typical APA printer receives a dot-image associated with the image to be displayed from a processor which is then printed. The processor, in other words, is required not only to generate a vector list of the image to be displayed on, for example, a storage tube, but also to convert that vector list into a dot-image for transmission to the APA printer. No APA printer is available which can obtain the information to be printed directly from the display itself. In fact, no currently available APA printer can even attach to a storage tue. This inability to print directly from the display requires a user to have an image which was edited on a display to be routed back to the host processor to be stored. The host then must route this newly stored image to an APA printer to be printed. The time and expense associated with using a host in this manner, as well as the user's desire for the capability to create a real-time copy of the image displayed resulted in the development of the image copier.

Currently available image copiers are used with direct-view storage tubes (DVST) to make copies of the image displayed on the DVST directly from the DVST itself. The DVST, of course, is a highly desirable display because of its inherent capability to display highly complex and detailed images. Copying an image from a DVST is accomplished by the analog scanning of the DVST and passing this analog scan on to a DVST-like element within the image copier. This scanning is controlled by all analog circuits. These image copiers are relatively expensive to purchase and operate. They also typically employ a photographic process (i.e., the paper is pressed against the DVST-like element) and paper which has both limited life and stringent temperature storage requirements. Currently available image copiers are also very limited and inflexible from a functional standpoint: the image to be copied cannot be manipulated, scaled or enhanced prior to copying; overlaying images on top of one another is impossible; and an image cannot be copied without first being displayed on the DVST.

DISCLOSURE OF THE INVENTION

The primary embodiment of the present invention is a digital electro-erosion image copier system which provides both the image manipulation capability of an APA printer and the direct copying capability of an analog image copier. The image copier system of the present invention employs a printer adapter card (PAC) which converts the analog signals from the image scanner to digital bits. These bits are then formatted and stored in a memory on the PAC such that the arrangement of these bits in the memory is a digital reproduction of the image displayed on the storage tube. These bits are then routed to a printhead to produce a real-time hard copy of the image displayed on the storage tube. The scanning, A-to-D conversion, bit formatting, bit storing and copying processes are all controlled by a single microprocessor.

The present invention has an abundance of advantages over currently available image copiers. These advantages include:

Substantially lower purchase price
Substantially lower operating costs
Substantially lower power consumption
Paper with unlimited life and no rigid storage requirements can be used
both 8½× virtually any length and 11× virtually any length outputs are available
Scaling capability is provided in both X and Y directions
Image manipulation and image enhancement capabilities are available
Image overlaying capabilities are available
Dual usage between storage tube and standard RS232 interface is possible
Storage tube image can be digitized and sent over RS232 interface with or without printing.

BEST MODE FOR CARRYING OUT THE INVENTION

Figure 1:
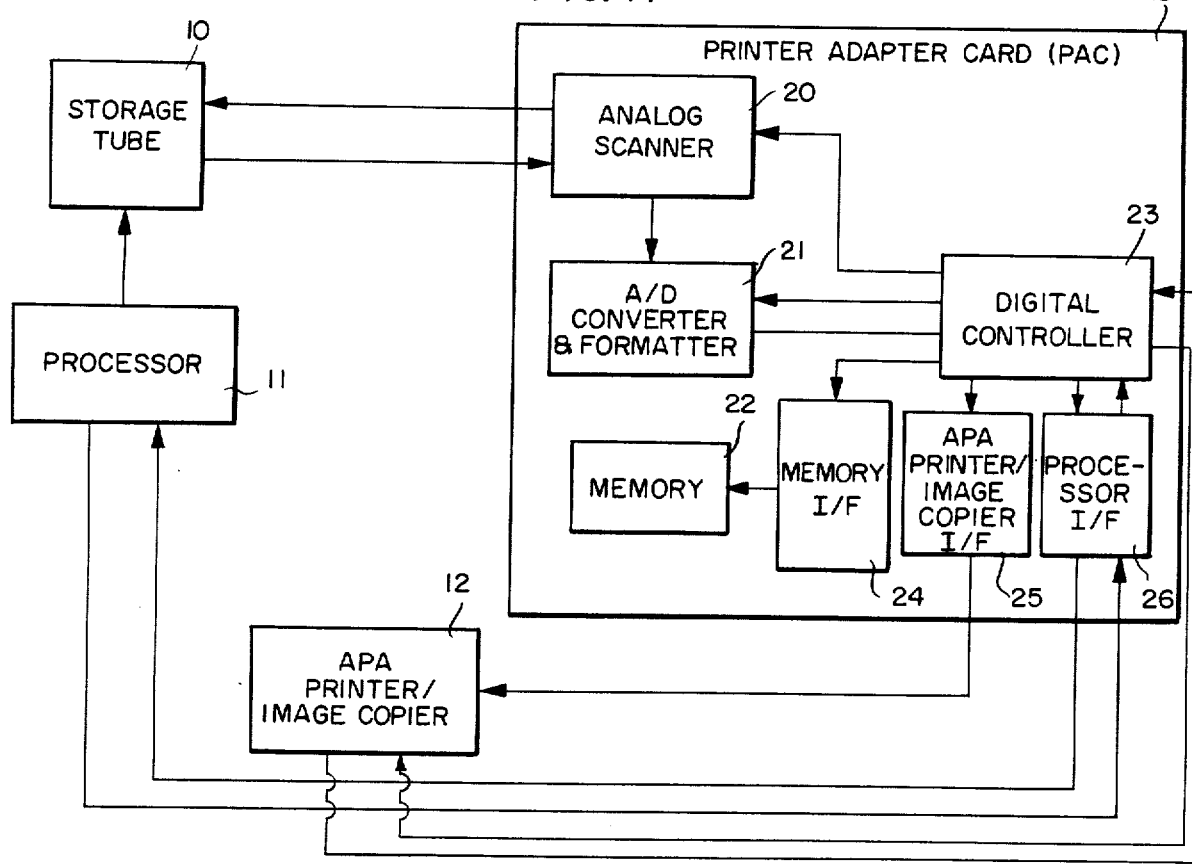
FIG. 1 is a functional block diagram of the PAC of the present invention.

Referring to FIG. 1, the present invention includes a storage tube 10, a processor 11, an APA Printer/Image Copier 12 and a Printer Adapter Card (PAC) 13. Storage tube 10 can be any kind of display tube which physically stores information on the face of the tube itself (e.g., a direct-view storage tube (DVST) or plasma gas panel display). Processor 11 can be any one of many types of general purpose processors (e.g., the IBM Personal Computer or the IBM Series 1 Computer).

Figure 2:
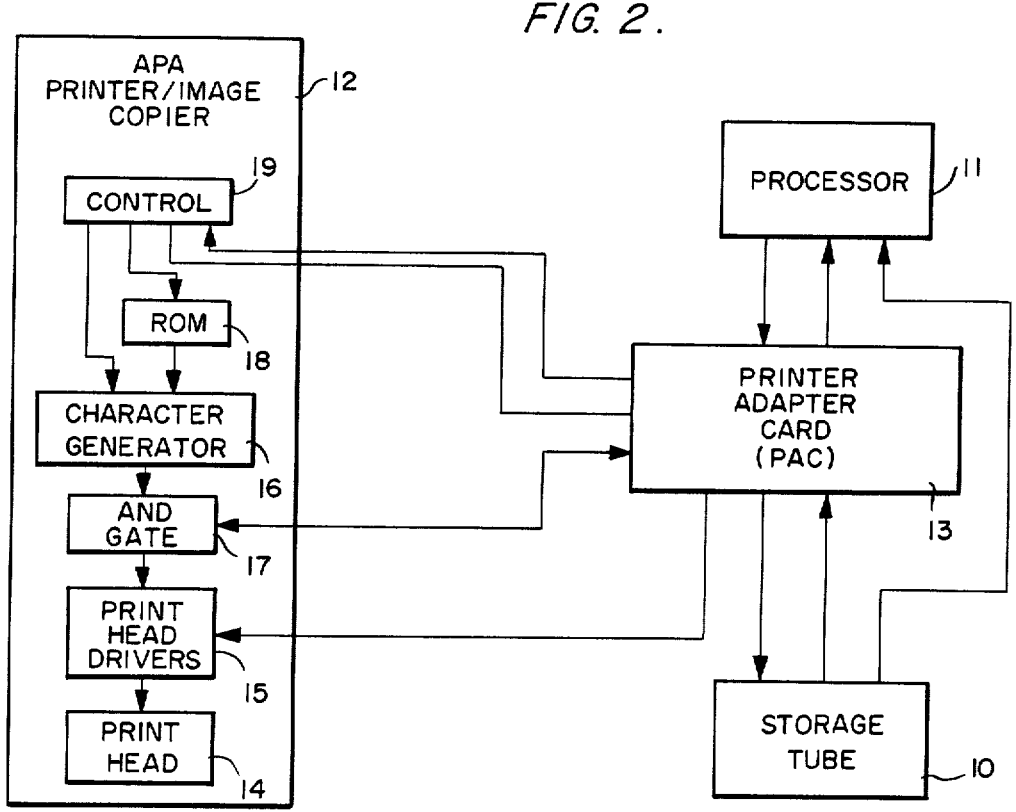
FIG. 2 is a block diagram of the APA Printer/Storage Tube Image Copier of the present invention.

Referring now to FIG. 2, APA Printer/Image Copier 12 has a dot-matrix type printhead 14 and associated printhead drivers 15. The preferred embodiment of the APA Printer/Image Copier is an electro-erosion printer, but any dot-matrix type printer can be used in the present invention.

Still referring to FIG. 2, APA Printer/Image Copier 12 also includes a character generator 16, gate 17, ROM 18 and control circuitry 19. Character generator 16 is degated by PAC 13 via AND gate 17 when the system of the present invention is operated in either the APA Printer or image copier modes discussed below. The only time character generator 16 is gated on is when APA Printer/Image Copier 12 is connected and controlled by a control unit (e.g., an IBM 3274). In this latter case PAC 13 degates itself and gates character generator 16.

Still referring to FIG. 2, the system of the present invention can operate as both an APA printer and an image copier. In the APA printer mode of operation, APA Printer/Image Copier 12 receives the image to be printed in dot-matrix form from PAC 13. This dot-matrix image is received from PAC 13 by printhead drivers 15. The interaction between PAC 13 and APA Printer/Image Copier 12 is controlled by PAC 13 in conjunction with control circuitry 19 and ROM 18. Control circuitry 19 includes at least one microprocessor and associated control logic while ROM 18 contains the instructions used by the microprocessor(s) within control circuitry 19. Both control circuitry 19 and ROM 18 are currently used in the IBM 3230 printer.

Referring now to FIG. 1, the system of the present invention can also operate in image copier mode. In this mode the image physically displayed and stored on the face of storage tube 10 is scanned by analog scanner 20. The analog signals representing the image on storage tube 10 are then converted to digital signals and formatted by A/D Converter & Formatter 21 so that a digital image of the image scanned from storage tube 10 is available (formatting can also occur before and during the scanning process by defining only a portion of the face of the storage tube as the area to be scanned). This digital image is then stored in memory 22. APA Printer/Image Copier 12 is then provided this image from memory 22 for printing. All PAC operations (both APA printer and image copier modes) are controlled by digital controller 23. A direct bi-directional path exists between digital controller 23 and control 19 (see FIG. 1). In addition, digital controller 23 bi-directionally communicates to processor 11 via processor interface (I/F) 26. Digital controller 23 also communicates to memory 22 via memory I/F 24 and to printhead drivers 15 in APA Printer/Image Copier 12 (see FIG. 2) via APA Printer/Image Copier I/F 25.

Figure 3:
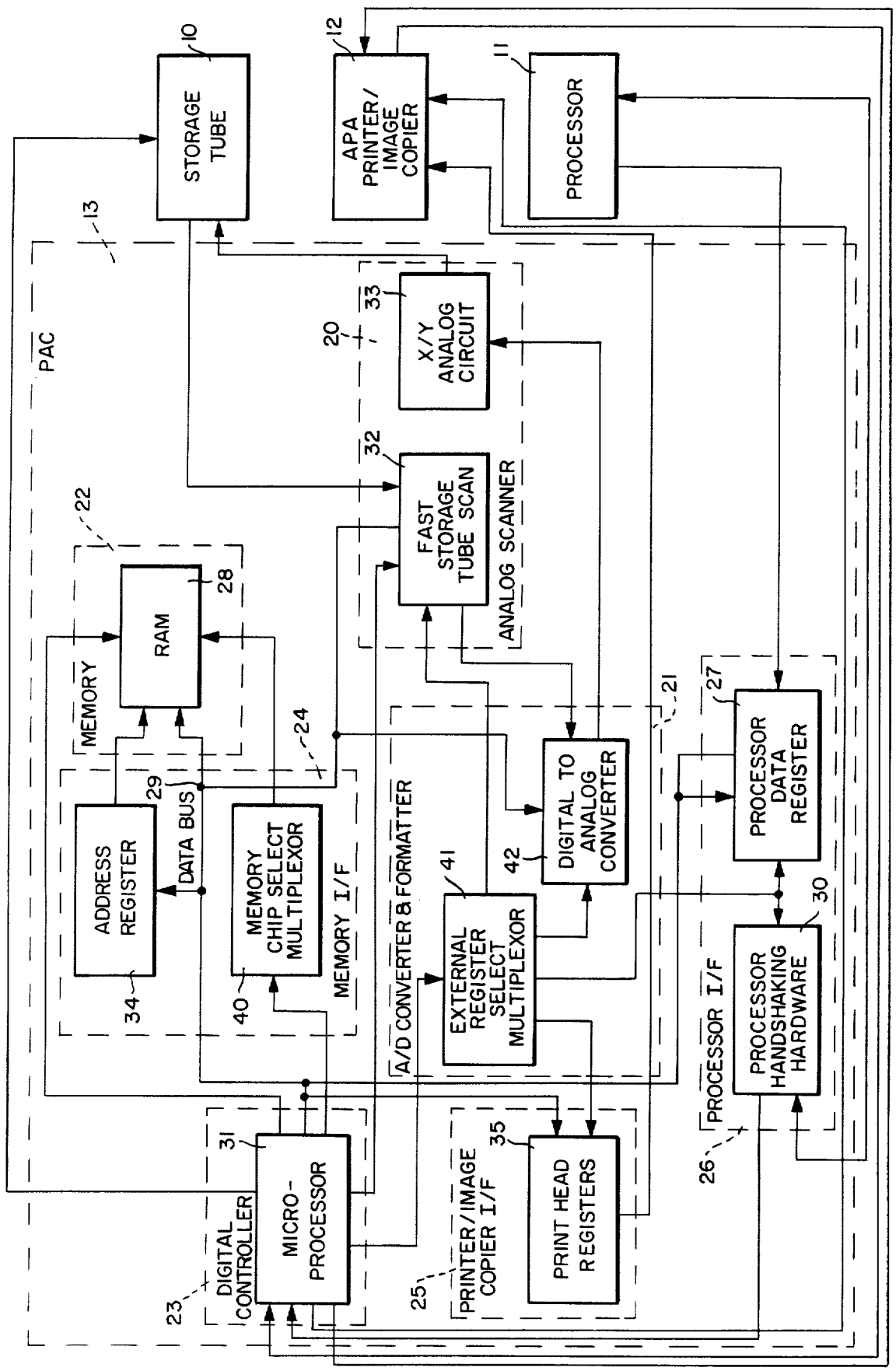
FIG. 3 is a detailed block diagram of the PAC used with the present invention.

Referring now to FIG. 3, the modes of operation and hardware described above will be discussed in detail. In APA printer mode, processor 11 routes a dot-matrix image to be printed to processor data register 27 where the image is temporarily stored for further routing to RAM 28 via bi-directional data bus 29. Address register 34 and memory chip select multiplexor 40 ensure that the image is stored in the selected location in RAM 28 (i.e., RAM 28 may be comprised of several discrete RAM chips). The image is then routed from RAM 28 to printhead registers 35 (via data bus 29), printhead drivers 15 (see FIG. 2) and printhead 14 (see FIG. 2) for printing. Printhead registers 35 are selected by external register select multiplexor 41. Processor handshaking hardware 30 facilitates the communications between processor 11 and microprocessor 31 (e.g., an Intel 8748) that are required to move this image from processor 11 to PAC 13 and finally to APA Printer/Image Copier 12. This asynchronous hardware 30 generates request-/acknowledge signals as well as busy signals.

Still referring to FIG. 3, in image copier mode, APA Printer/Image Copier 12 directly copies the image displayed off storage tube 10. Analog scanner 20 (see FIG. 2) includes fast storage tube scan 32 and X/Y analog circuit 33. These circuits 32 and 33 under the control of microprocessor 31 perform a raster scan of the face of the storage tube 10 (i.e., individual points on the display screen are addressed and interrogated). The signals resulting from this raster scan operation are routed back to circuit 32 where they are converted into digital form and then formatted by storing them in shift registers. Microprocessor 31 then loads the contents of these shift registers onto data bus 29 to be routed to RAM 28 to be stored. Just as in the APA printer mode, the printing path from RAM 28 to printhead 14 includes printhead registers 35 and printhead drivers 15. Once the portion of the image data currently stored is read out of printhead registers 35 and printed, APA Printer/Image Copier 12 interrupts microprocessor 31 to cause this microprocessor to move the next increment of the image stored in RAM 28 into printhead registers 35 for printing. In addition, because microprocessor 31 controls all interfaces (i.e., storage tube-PAC, processor-PAC, APA Printer/Image Copier-PAC), both storage tube 10 and processor 11 can be simultaneously connected to APA Printer/Image Copier 12. Microprocessor 31 can assign different priorities to these devices. The processor output, as well as the image on the storage tube, can also be printed in an overlaid fashion.

The APA Printer/Image Copier system of the present invention provides real-time output directly from a storage tube and APA printer capabilities in one device. The PAC and the APA Printer/Image Copier of the preferred embodiment of the present invention also has a purchase price that is approximately 40% less than currently available image copiers. Moreover, the operating costs associated with the present invention are approximately ¼ those of currently available image copiers. In addition, the PAC and APA Printer/Image Copier of the preferred embodiment of the present invention consumes approximately ¼ the power consumed by currently available image copiers. The electro-erosion APA Printer/Image Copier embodiment of the present invention also uses paper with no storage requirements and unlimited life.

Because the present invention creates a digital version of the image displayed on the storage tube that is accessible by a microprocessor, both 8½ × virtually any length and 11× virtually any length outputs can be easily created (i.e., the length of the printed/copied image is limited only by the length of the paper available on, for example, a paper roll). Scaling is also provide in both X and Y directions. In addition, the image can be readily manipulated and/or enhanced or even overlaid with previously copied image(s).

The present invention can also be modified to include a standard RS232 interface in addition to the APA Printer/Image Copier output. This modification can be made by simply providing another output path (or multiplexing a single output path) from RAM 28 or printhead registers 35 to an RS232 output port. This modification allows the image on the storage tube to be digitized and send out an RS232 interface with or without printing.

Figure 4:
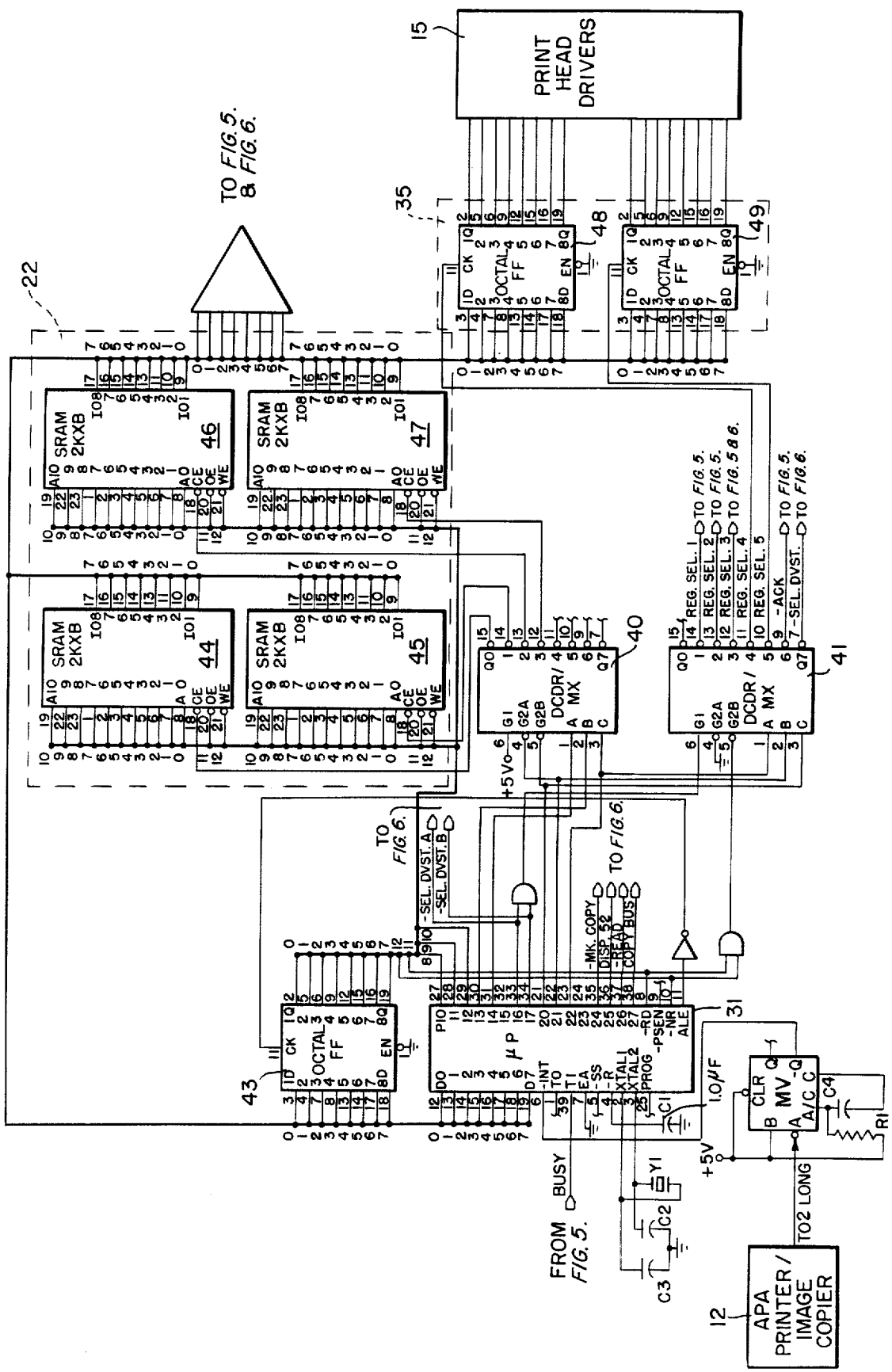
FIGS. 4–6 are a detailed schematic of the PAC employed in the present invention.
Figure 5:
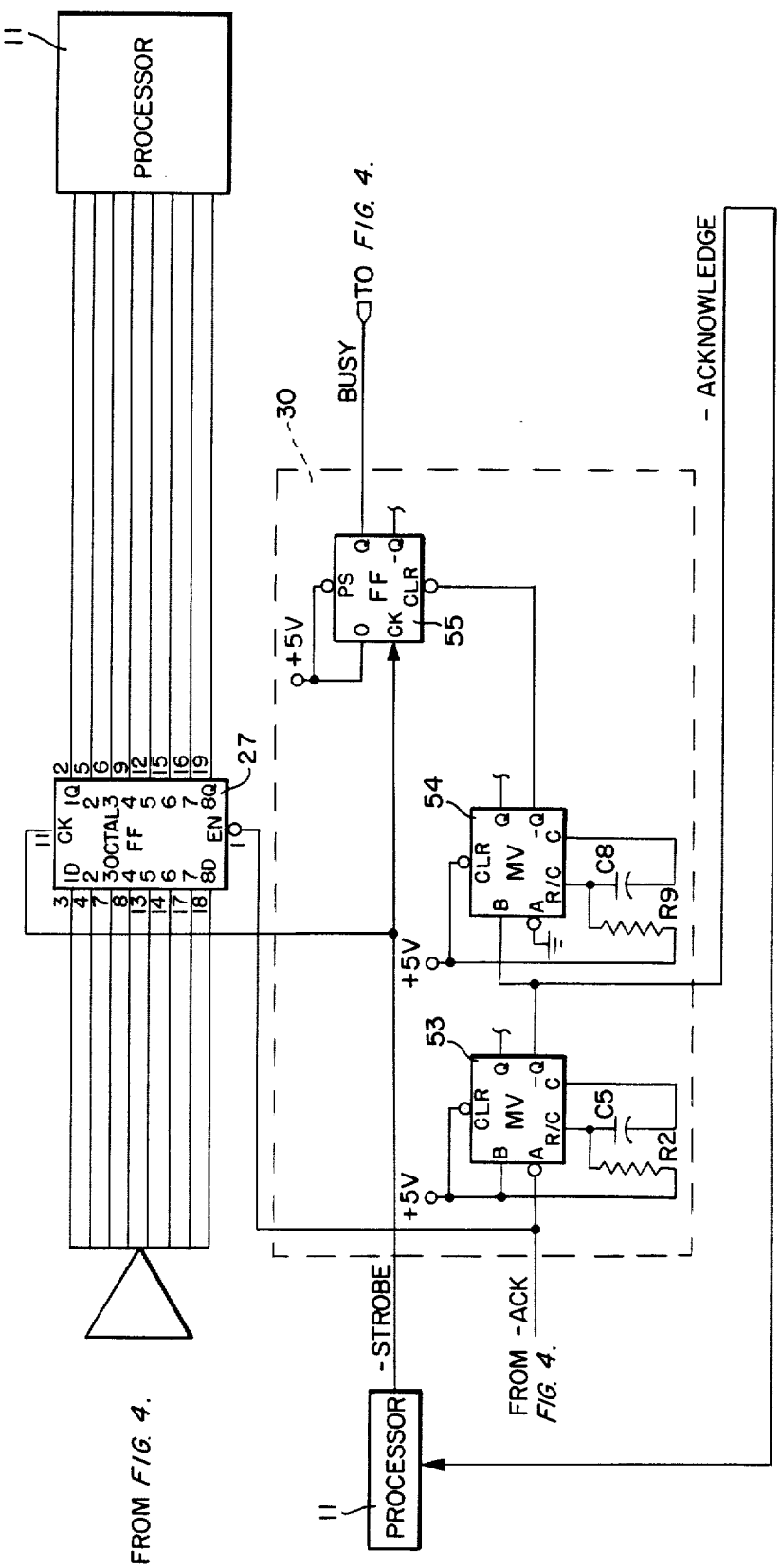
Figure 6:
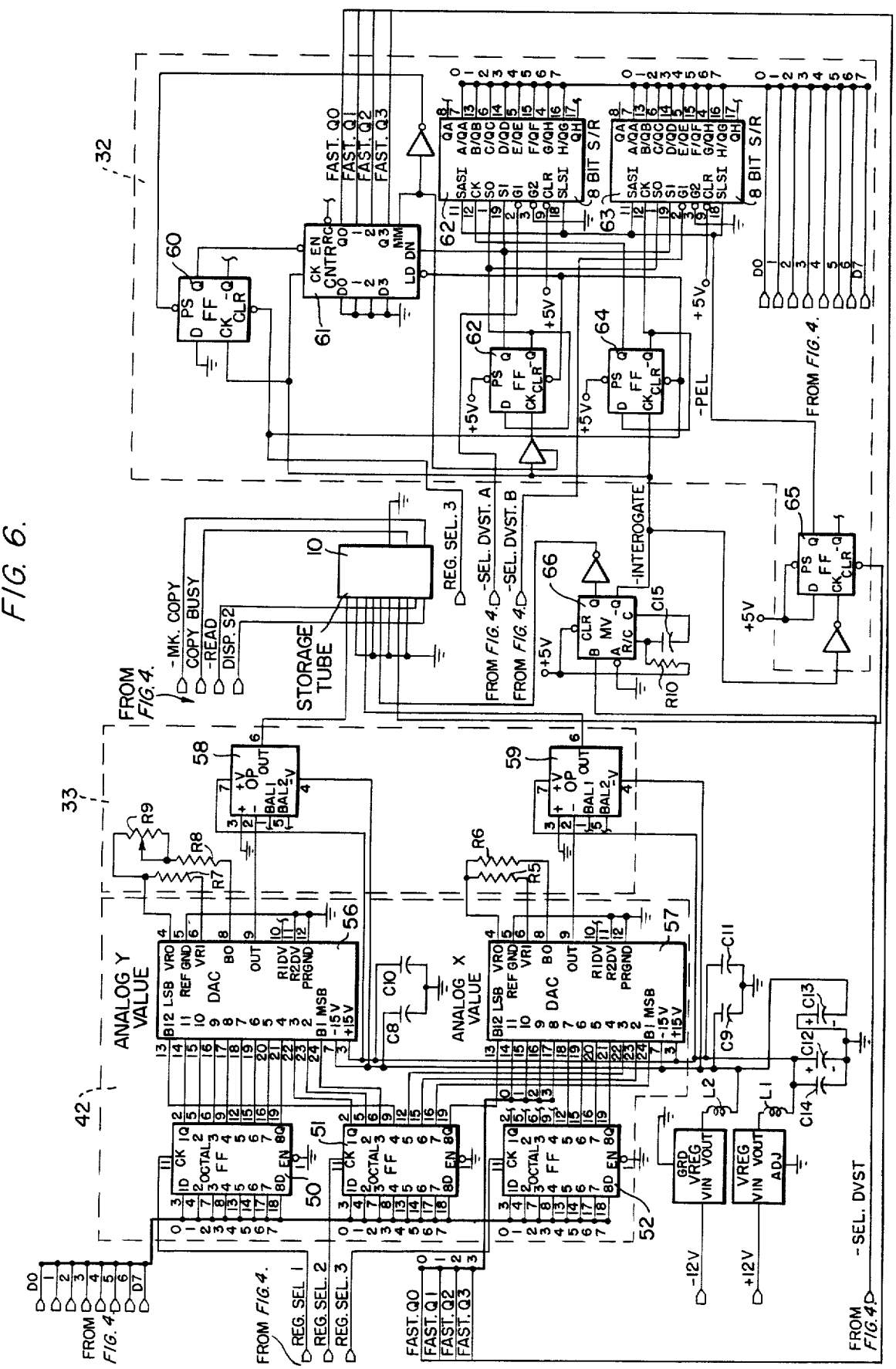

Referring now to FIGS. 4–6, a detailed, component level description of the preferred embodiment of the PAC used in the present invention will be provided. Referring to FIG. 4, microprocessor 31 can be, for example, an Intel 8748. Flip-flop 43 (e.g., a 74LS374) is used in conjunction with microprocessor 31 to set-up the address for memory 22. Memory 22 is comprised of four 2k×8 RAM modules (e.g., AMD 128) 44, 45, 46 and 47. Multiplexors 40 and 41 (e.g., 74LS138s) select one of the four RAM modules 44–47 and one of the five registers 48–52 (e.g., 74LS374s), respectively (see FIG. 5 for registers 50–52). Only one of the used outputs of either of these multiplexors will be active at once. This prevents inadvertently accessing and destroying the RAM contents.

Referring now to FIG. 5, a 74LS374 can be used for processor data register 27 while two one-shots 53–54 (e.g., 74LS123s) and flip-flop 55 (e.g., a 74LS74) comprise processor handshaking hardware 30. One-shot 53 makes the 1200 nsec acknowledge signal from microprocessor 31 into a 500 nsec acknowledge that processor 11 requires. One-shot 54 uses the rising edge of the acknowledge signal generated by one-shot 53 to clear flip-flop 55 which generates the busy signal.

Referring now to FIG. 6, two digital-to-analog converters (56 and 57) (e.g., AD 585s) are used with two operational amplifier drivers 58 and 59 (e.g., LM 356s) to define and set-up the X-Y scanning values required to pin-point the starting point of the area on the storage tube to be scanned. These X-Y values are, of course, incremented as the storage tube is scanned (i.e., these X-Y values indicate each point on the storage tube that is currently being scanned). Y scan values are, for example, incremented from 0-number of bits between the top and bottom of the screen (i.e., a vertical scan) by microprocessor 31. X scan values are incremented from 0—15 with flip-flops 60 and 62 (e.g., 74LS74s) and counter 61 (e.g., 74191) (low-order) and microprocessor 31 (high-order). This sixteen bit range for X scan values is dictated by the memory/register configuraton employed (i.e., two 8-bit registers 62 and 63 —e.g., 74LS299s-store the group of sixteen scan values).

Still referring to FIG. 6, flip flops 64 and 65 (e.g., 74LS74s) interrogate the pels on the screen of the storage tube and serve as a type of analog-to-digital converter function. Because the X-Y scan values are already known as each pel is scanned or interrogated, the image on the storage tube can be readily converted into digital form by flip-flops 64 and 65. Flip-flop 64 is reset by the interrogate signal generated by one-shot 66 (e.g., a 74LS123). If the pel located at the spot designated by the X-Y scan values is illuminated the output of flip-flop 65 is a logic one. If the pel is not illuminated, the output of flip-flop 65 is a logic zero. These digital outputs are located into registers 62 and 63 and thus formatted during this interrogation/scanning of the storage tube.

While the present invention has been particularly described with reference to the preferred embodiment thereof, it will be understood by those skilled in the art that various changes in form and detail can be made therein without departing from the spirit and scope of the invention as illustrated in the appended claims.

We claim:

1. A digital APA Printer/Image copier system for copying an image displayed on a storage tube directly from said storage tube comprising:
    said storage tube for displaying said image;
    a processor coupled to said storage tube for routing said image to be displayed to said storage tube;
    an adapter means coupled to said storage tube for scanning said storage tube, converting said image scanned from said storage tube into digital bits and storing said digital bits in dot-matrix raster form and
    a printhead means coupled to said adapter means for receiving said digital bits and providing a hard copy of said image displayed on said storage tube.

2. The digital APA Printer/Image Copier system of claim 1, further comprising:
    means for scaling said image in both X and Y directions.

3. The digital APA Printer/Image Copier system of claim 1, wherein: said system is capable of operating in APA printer mode, image copier mode, and control unit mode.

4. The digital APA Printer/Image Copier system of claim 1, further comprising:
    means for manipulating and enhancing said image.

5. The digital APA Printer/Image Copier system of claim 1, further comprising:
    means for overlaying additional images upon said image.

6. The digital APA Printer/Image Copier system of claim 1, further comprising:
    an RS232 interface for sending said image.

7. An electro-erosion APA Printer/Image Copier system for copying an image displayed on a storage tube directly from said storage tube comprising:
    said storage tube for displaying said image;
    a processor means coupled to said storage tube for routing said image to be displayed to said storage tube;
    an analog scanning means coupled to said storage tube for detecting said image displayed on said storage tube and representing said image as a formatted plurality of digital bits;
    a memory means for storing said digital bits in dot-matrix raster form after said digital bits are formatted;
    an electro-erosion printhead means for receiving said digital bits and providing a real-time hard copy of said image displayed on said storage tube and
    a digital control means coupled to said processor means, electro-erosion printhead means, said analog scanning means, and said memory means for controlling said electro-erosion printhead means, said analog scanning means, and said memory means.

8. The digital APA Printer/Image Copier system on claim 7, wherein:
    said printhead means prints said hard copy on conventional paper.

9. A digital APA Printer/Image Copier system capable of operating in APA printer mode, image copier mode, and control unit mode comprising:
    a storage tube for displaying an image;
    a processor coupled to said storage tube for routing said image to be displayed to said storage tube when said system is in said image copier mode and for generating information intended to be printed without first displaying said information when said system is in said APA printer mode;
    an adapter means coupled to said storage tube for scanning said storage tube, converting said image scanned from said storage tube into digital bits and storing said digital bits in dot-matrix raster form, and for receiving and further routing said information intended to be printed; and
    a printhead means coupled to said adapter means for receiving said digital bits and providing a hard copy of said image displayed on said storage tube, and for receiving and providing a hard copy of said information intended to be printed.

10. An electro-erosion APA Printer/Image Copier system capable of operating in APA printer mode, image copier mode, and control unit mode comprising:
    a storage tube for displaying image;
    a processor means coupled to said storage tube for routing said image to be displayed to said storage tube when said system is in said image copier mode and for generating information intended to be printed without first displaying said information when said system is in said APA printer mode;
    an analog scanning means coupled to said storage tube for detecting said image displayed on said storage tube and representing said image as a formatted plurality of digital bits;

a memory means for storing said digital bits in dot-matrix raster form after said digital bits are formatted, and for storing said information intended to be printed;

an electro-erosion printhead means for receiving said digital bits and providing a real-time hard copy of said image displayed on said storage tube when said system is in said image copier mode, and for receiving and providing a hard copy of said information intended to be printed when said system is in said APA printer mode; and a digital control means coupled to said processor means, electro-erosion printhead means, said analog scanning means, and said memory means for controlling said electro-erosion printhead means, said analog scanning means, and said memory means.

11. A digital APA Printer/Copier system capable of operating in APA printer mode, image copier mode, and control unit mode comprising:

a storage tube for displaying an image;

a processor coupled to said storage tube for routing said image to be displayed to said storage tube;

a character generator for generating characters to be printed;

an adapter means coupled to said storage tube for scanning said storage tube, converting said image scanned from said storage tube into digital bits and storing said digital bits in dot-matrix raster form;

a printhead means coupled to said adapter means for receiving said digital bits and providing a hard copy of said image displayed on said storage tube and for providing a hard copy of said characters to be printed; and a gate means coupled to said character generator and said adapter means, and controlled by said adapter means for selectively connecting said character generator and said adapter means to said printhead means when said system is in control unit mode; said character generator being disconnected from and said adapter means being connected to said printhead means when said image is copied directly from said storage tube.

12. An electro-erosion APA Printer/Image Copier system capable of operating in APA printer mode, image copier mode, and control unit mode comprising:

a storage tube for displaying an image;

a processor means coupled to said storage tube for routing said image to be displayed to said storage tube;

a character generator for generating characters to be printed;

an analog scanning means coupled to said storage tube for detecting said image displayed on said storage tube and representing said image as a formatted plurality of analog signals;

a memory means for storing said digital bits in dot-matrix raster form after said digital bits are formatted;

an electro-erosion printhead means for receiving said digital bits and providing a real-time hard copy of said image displayed on said storage tube, and for providing a hard copy of said characters to be printed;

a digital control means coupled to said processor means, electro-erosion printhead means, said analog scanning means, and said memory means for controlling said electro-erosion printhead means, said analog scanning means, and said memory means; and a gate means coupled to said character generator and said digital control means, and controlled by said digital means for selectively connecting said character generator and said memory means to said electro-erosion printhead means when said system is in control unit mode; said character generator being disconnected from and said memory means being connected to said electro-erosion printhead means when said image is copied directly from said storage tube.

* * * * *

UNITED STATES PATENT AND TRADEMARK OFFICE
CERTIFICATE OF CORRECTION

PATENT NO. : 4,597,051

DATED : June 24, 1986

INVENTOR(S) : W. F. BEAUSOLEIL ET AL

It is certified that error appears in the above-identified patent and that said Letters Patent is hereby corrected as shown below:

Claim 10, line 60   After "displaying" insert --an--.

Signed and Sealed this

Twenty-third Day of December, 1986

Attest:

DONALD J. QUIGG

*Attesting Officer*   *Commissioner of Patents and Trademarks*

UNITED STATES PATENT AND TRADEMARK OFFICE
CERTIFICATE OF CORRECTION

PATENT NO. : 4,597,051

DATED : June 24, 1986

INVENTOR(S) : William F. Beausoleil et al

It is certified that error appears in the above-identified patent and that said Letters Patent is hereby corrected as shown below:

Col. 1, line 24    Delete "tue" and insert therefor --tube--.

Col. 4, lines 36-37    Delete "provide" and insert therefor --provided--.

Col. 4, line 66    Delete "(e.g., 74LS(123s) and insert therefor --(e.g., 74LS(123s))--.

Signed and Sealed this

Thirteenth Day of October, 1987

Attest:

DONALD J. QUIGG

*Attesting Officer*     *Commissioner of Patents and Trademarks*